(12) United States Patent
Yoneyama

(10) Patent No.: US 10,629,106 B2
(45) Date of Patent: Apr. 21, 2020

(54) PROJECTION DISPLAY DEVICE, PROJECTION DISPLAY METHOD, AND PROJECTION DISPLAY PROGRAM

(71) Applicant: FUJIFILM Corporation, Tokyo (JP)

(72) Inventor: Kazuya Yoneyama, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/357,339

(22) Filed: Mar. 19, 2019

(65) Prior Publication Data

US 2019/0213932 A1    Jul. 11, 2019

Related U.S. Application Data

(63) Continuation of application No. PCT/JP2017/032183, filed on Sep. 7, 2017.

(30) Foreign Application Priority Data

Sep. 26, 2016  (JP) .................................. 2016-186863

(51) Int. Cl.
*G09G 3/00* (2006.01)
*G02B 27/01* (2006.01)
(Continued)

(52) U.S. Cl.
CPC .............. *G09G 3/001* (2013.01); *B60K 35/00* (2013.01); *G02B 27/0101* (2013.01);
(Continued)

(58) Field of Classification Search
CPC .... B60Q 9/00; B60K 35/00; B60K 2370/334; B60K 2370/52; G02B 27/0101;
(Continued)

(56) References Cited

U.S. PATENT DOCUMENTS

2016/0073031 A1* 3/2016 Watanabe ............. G02F 1/0121
                                                                 345/7
2016/0161833 A1* 6/2016 Watanabe ............. B60K 35/00
                                                                 345/7

FOREIGN PATENT DOCUMENTS

JP          05278498 A    * 10/1993
JP          H05278498       10/1993
(Continued)

OTHER PUBLICATIONS

JP_11-5456_A (Machine Translation on Sep. 12, 2019) (Year: 1999).*

(Continued)

*Primary Examiner* — Michael Le
(74) *Attorney, Agent, or Firm* — JCIPRNET

(57) ABSTRACT

A projection display device mounted in a vehicle includes a light modulation unit that spatially modulates, in accordance with image data that has been input, light emitted by a light source; a projection optical system that projects the light that has been spatially modulated onto a projection surface of the vehicle; and an image data control unit 63 that controls image data to be input to the light modulation unit. The image data control unit 63 performs, in a first mode in which driving is performed in accordance with an internally generated instruction or an externally and wirelessly received instruction, control to switch between projection of image light for normal display onto the projection surface 2 and projection of image light for warning display onto the projection surface 2.

20 Claims, 7 Drawing Sheets

(51) Int. Cl.
*B60K 35/00* (2006.01)
*G09G 5/02* (2006.01)
*G03B 21/00* (2006.01)
*G09G 5/00* (2006.01)
*H04N 5/74* (2006.01)
*B60Q 9/00* (2006.01)

(52) U.S. Cl.
CPC .............. *G03B 21/00* (2013.01); *G09G 3/002* (2013.01); *G09G 5/00* (2013.01); *G09G 5/026* (2013.01); *H04N 5/74* (2013.01); *B60K 2370/334* (2019.05); *B60K 2370/52* (2019.05); *B60Q 9/00* (2013.01); *G02B 2027/0141* (2013.01); *G09G 2320/0666* (2013.01); *G09G 2320/10* (2013.01); *G09G 2340/045* (2013.01); *G09G 2340/12* (2013.01); *G09G 2340/14* (2013.01); *G09G 2370/16* (2013.01); *G09G 2380/10* (2013.01)

(58) Field of Classification Search
CPC ....... G02B 2027/0141; G09G 2380/10; G09G 3/002; G09G 5/00; G09G 2370/16; G09G 3/001; G09G 2320/0666; G09G 2320/10; G09G 2340/045; G09G 2340/12; G09G 2340/14; G09G 5/026; H04N 5/74; G03B 21/00

See application file for complete search history.

(56) References Cited

FOREIGN PATENT DOCUMENTS

| JP | 07257229 A | * | 10/1995 |
|---|---|---|---|
| JP | H07257229 | | 10/1995 |
| JP | 11005456 A | * | 1/1999 |
| JP | H115456 | | 1/1999 |
| JP | 2001018681 | | 1/2001 |
| JP | 2001018681 A | * | 1/2001 |
| JP | 2006171465 | | 6/2006 |
| JP | 2006171465 A | * | 6/2006 |
| JP | 2008102449 | | 5/2008 |
| JP | 2010208631 | | 9/2010 |
| JP | 2012077202 | | 4/2012 |
| JP | 2015045782 | | 3/2015 |
| JP | 2016055674 | | 4/2016 |
| JP | 2016130104 | | 7/2016 |
| JP | 2016130104 A | * | 7/2016 |
| JP | 2016142988 | | 8/2016 |
| JP | 2016142988 A | * | 8/2016 |

OTHER PUBLICATIONS

JP_05-278498_A (Machine Translation on Sep. 12, 2019) (Year: 1993).*
JP_2006-171465_A (Machine Translation on Sep. 12, 2019) (Year: 2006).*
JP_7-257229_A (Machine Translation on Sep. 12, 2019) (Year: 1995).*
JP_2016-130104_A (Machine Translation on Sep. 12, 2019) (Year: 2016).*
JP_2001-18681_A (Machine Translation on Sep. 12, 2019) (Year: 2001).*
JP_2016-142988_A (Machine Translation on Sep. 12, 2019) (Year: 2016).*
"International Search Report (Form PCT/ISA/210) of PCT/JP2017/032183," dated Nov. 28, 2017, with English translation thereof, pp. 1-5.
"International Preliminary Report on Patentability (Form PCT/IPEA/409) of PCT/JP2017/032183," completed on Sep. 5, 2018, with English translation thereof, pp. 1-10.

* cited by examiner

PROJECTION DISPLAY DEVICE, PROJECTION DISPLAY METHOD, AND PROJECTION DISPLAY PROGRAM

CROSS-REFERENCE TO RELATED APPLICATIONS

This application is a Continuation of PCT International Application No. PCT/JP2017/032183 filed on Sep. 7, 2017, which claims priority under 35 U.S.C § 119(a) to Japanese Patent Application No. 2016-186863 filed on Sep. 26, 2016. Each of the above application(s) is hereby expressly incorporated by reference, in its entirety, into the present application.

BACKGROUND OF THE INVENTION

1. Field of the Invention

The present invention relates to a projection display device, a projection display method, and a non-transitory computer readable recording medium storing a projection display program.

2. Description of the Related Art

A head-up display (HUD) for a vehicle has been known. In the HUD, a combiner that is disposed on a windshield of a vehicle, such as an automobile, a train, a ship, a construction machine, a heavy machine, an aircraft, or an agricultural machine, or that is disposed near a position before the windshield is used as a screen, and light is projected onto the screen to display an image. The HUD enables a driver to visually recognize an image that is based on light projected from the HUD as a real image on the screen or as a virtual image in front of the screen.

Systems for assisting driving by using the HUD are described in JP2012-77202A, JP2016-55674A, and JP2010-208631A. JP2012-77202A, JP2016-55674A, and JP2010-208631A each describe an HUD that projects image light onto a windshield or a combiner of an automobile to display a virtual image.

The HUD described in JP2010-208631A is aimed at adjusting the display position of a virtual image and switches between a state where the background of the virtual image is transparent and a state where the background of the virtual image is colored so that the range where image light is projected is recognized.

JP2008-102449A describes a display device for use in an automobile, which displays a virtual image and a real image in combination.

SUMMARY OF THE INVENTION

In recent years, automated driving or remote driving of vehicles has been developed toward practical use. While automated driving or remote driving is being performed, a situation may occur where the driver is not looking forward carefully, but is seeing carelessly. Meanwhile, if danger, a vehicle anomaly, or the like occurs, it is necessary to reliably notify the driver of the event. Even during automated driving or remote driving, the line of sight of the driver is highly likely to be directed forward. Thus, it is effective to project image light onto a windshield or combiner that is likely to overlap with the line of sight of the driver, thereby displaying danger, a vehicle anomaly, or the like.

In the HUD described in JP2012-77202A, the driver is caused to perceive danger using the degree of blur of a virtual image. Thus, the purpose of a warning is hard to be transmitted to the driver. In addition, it is impossible to present detailed information to the driver.

In the HUD described in JP2016-55674A, an opaque plate is inserted into a path through which image light passes in an emergency, and a real image is displayed on the opaque plate to notify the driver of danger. Thus, the opaque plate and a mechanism for moving the opaque plate are necessary, which increases the cost.

In the HUD described in JP2010-208631A, no consideration is given to how to effectively notify the driver of danger or the like.

In the display device described in JP2008-102449A, display is not performed by using a windshield or combiner. Thus, when a warning or the like is displayed thereon, the driver is unlikely to perceive the warning.

In each of JP2012-77202A, JP2016-55674A, JP2010-208631A, and JP2008-102449A, no consideration is given to display in the case of automated driving or remote driving.

The present invention has been made in view of the above-described circumstances, and an object of the present invention is to provide a projection display device, a projection display method, and a non-transitory computer readable recording medium storing a projection display program that are capable of increasing the degree of recognition of information to be transmitted to a driver during automated driving or remote driving.

A projection display device of the present invention is a projection display device mounted in a vehicle, the vehicle being equipped with a first mode in which driving is performed in accordance with an internally generated instruction or an externally and wirelessly received instruction, the projection display device including: a light modulation unit that spatially modulates, in accordance with image data that has been input, light emitted by a light source; a projection optical system that projects the light that has been spatially modulated onto a windshield of the vehicle or a combiner mounted in the vehicle; and an image data control unit that controls image data to be input to the light modulation unit, wherein the image data control unit performs, in the first mode, control to switch the image data to be input to the light modulation unit between first image data and second image data, the first image data is constituted by a pixel data group corresponding to first display information and a pixel data group corresponding to a background portion which is different from the first display information, and, in a state where the first image data has been input to the light modulation unit, the light that has been spatially modulated in accordance with the pixel data group corresponding to the background portion does not reach the windshield or the combiner whereas the light that has been spatially modulated in accordance with the pixel data group corresponding to the first display information reaches the windshield or the combiner, and the second image data is constituted by a pixel data group corresponding to second display information and a pixel data group corresponding to a background portion which is different from the second display information, and, in a state where the second image data has been input to the light modulation unit, at least the light that has been spatially modulated in accordance with the pixel data group corresponding to the background portion out of the light that has been spatially modulated in accordance with the pixel data group corresponding to the background portion and the light that has been spatially modulated in accordance with the pixel data group corresponding to the second display information reaches the windshield or the combiner.

A projection display method of the present invention is a projection display method using a light modulation unit that spatially modulates, in accordance with image data that has been input, light emitted by a light source, and a projection optical system that projects the light that has been spatially modulated onto a windshield of a vehicle or a combiner mounted in the vehicle, the vehicle being equipped with a first mode in which driving is performed in accordance with an internally generated instruction or an externally and wirelessly received instruction, the projection display method including an image data control step of controlling image data to be input to the light modulation unit, wherein the image data control step performs, in the first mode, control to switch the image data to be input to the light modulation unit between first image data and second image data, the first image data is constituted by a pixel data group corresponding to first display information and a pixel data group corresponding to a background portion which is different from the first display information, and, in a state where the first image data has been input to the light modulation unit, the light that has been spatially modulated in accordance with the pixel data group corresponding to the background portion does not reach the windshield or the combiner whereas the light that has been spatially modulated in accordance with the pixel data group corresponding to the first display information reaches the windshield or the combiner, and the second image data is constituted by a pixel data group corresponding to second display information and a pixel data group corresponding to a background portion which is different from the second display information, and, in a state where the second image data has been input to the light modulation unit, at least the light that has been spatially modulated in accordance with the pixel data group corresponding to the background portion out of the light that has been spatially modulated in accordance with the pixel data group corresponding to the background portion and the light that has been spatially modulated in accordance with the pixel data group corresponding to the second display information reaches the windshield or the combiner.

A non-transitory computer readable recording medium storing a projection display program of the present invention is a non-transitory computer readable recording medium storing a projection display program using a light modulation unit that spatially modulates, in accordance with image data that has been input, light emitted by a light source, and a projection optical system that projects the light that has been spatially modulated onto a windshield of a vehicle or a combiner mounted in the vehicle, the vehicle being equipped with a first mode in which driving is performed in accordance with an internally generated instruction or an externally and wirelessly received instruction, the projection display program causing a computer to execute an image data control step of controlling image data to be input to the light modulation unit, wherein the image data control step performs, in the first mode, control to switch the image data to be input to the light modulation unit between first image data and second image data, the first image data is constituted by a pixel data group corresponding to first display information and a pixel data group corresponding to a background portion which is different from the first display information, and, in a state where the first image data has been input to the light modulation unit, the light that has been spatially modulated in accordance with the pixel data group corresponding to the background portion does not reach the windshield or the combiner whereas the light that has been spatially modulated in accordance with the pixel data group corresponding to the first display information reaches the windshield or the combiner, and the second image data is constituted by a pixel data group corresponding to second display information and a pixel data group corresponding to a background portion which is different from the second display information, and, in a state where the second image data has been input to the light modulation unit, at least the light that has been spatially modulated in accordance with the pixel data group corresponding to the background portion out of the light that has been spatially modulated in accordance with the pixel data group corresponding to the background portion and the light that has been spatially modulated in accordance with the pixel data group corresponding to the second display information reaches the windshield or the combiner.

According to the present invention, it is possible to provide a projection display device, a projection display method, and a non-transitory computer readable recording medium storing a projection display program that are capable of increasing the degree of recognition of information to be transmitted to a driver during automated driving or remote driving.

DESCRIPTION OF THE PREFERRED EMBODIMENTS

Hereinafter, an embodiment of the present invention will be described with reference to the drawings.

Figure 1:
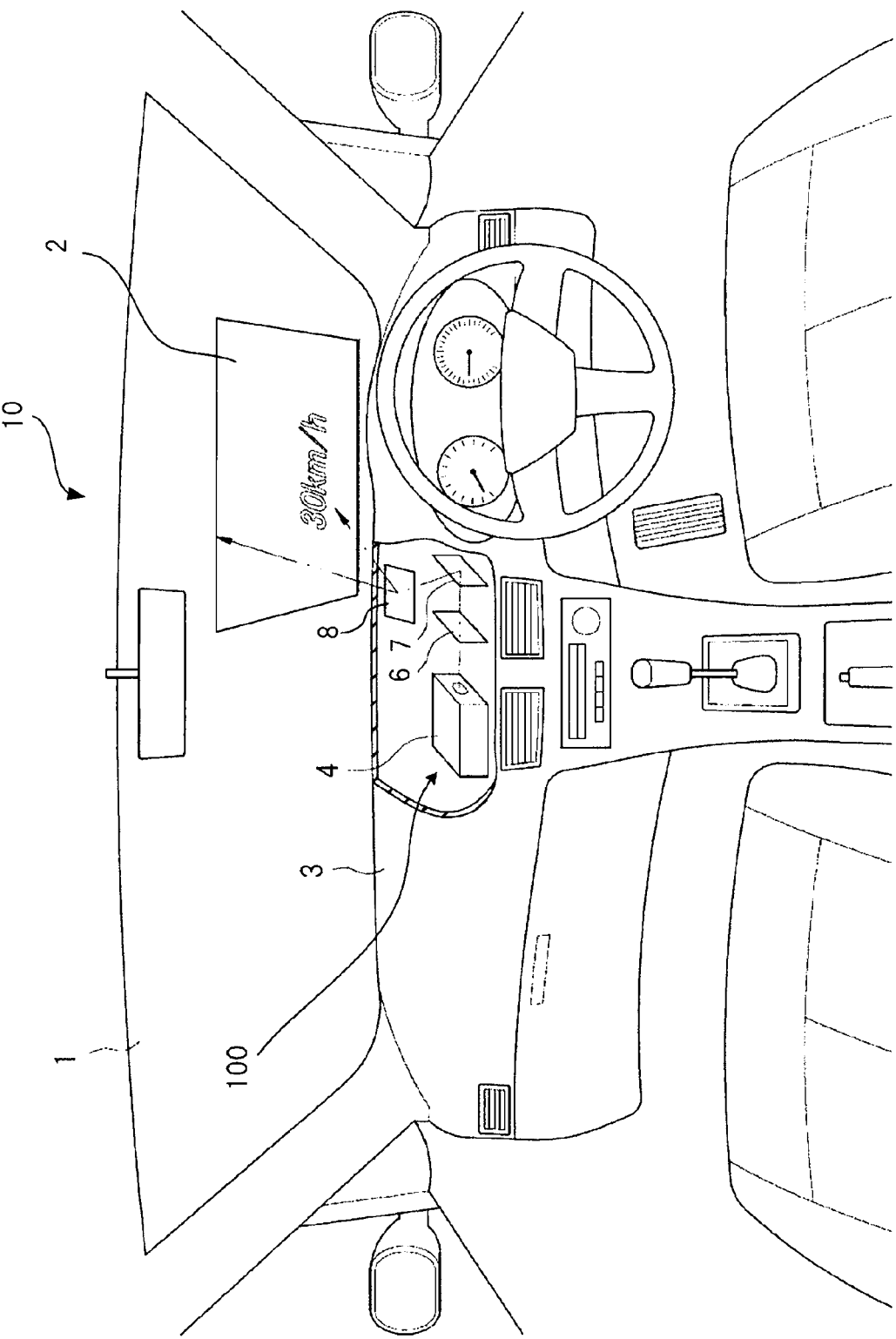
FIG. 1 is a schematic diagram illustrating an indoor configuration of an automobile 10 in which an HUD 100, which is an embodiment of a projection display device of the present invention, is mounted.
Figure 2:
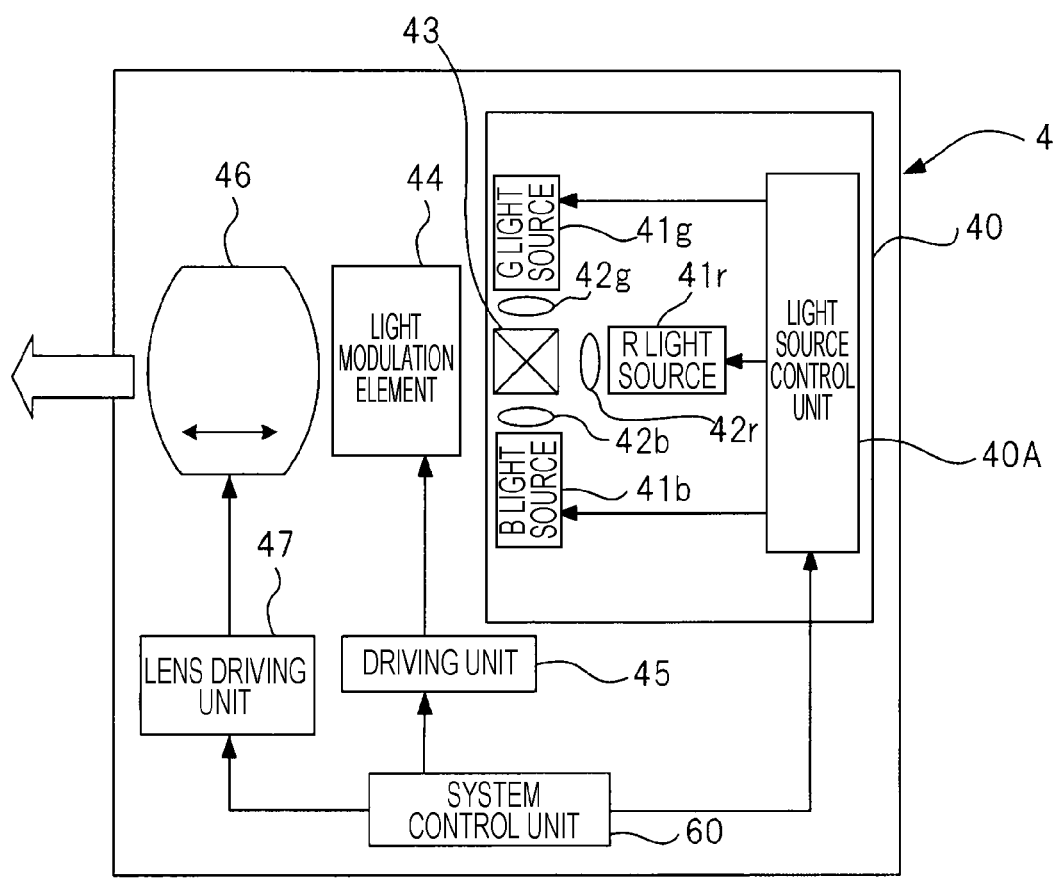
FIG. 2 is a schematic diagram illustrating an internal hardware configuration of a control unit 4 of the HUD 100 illustrated in FIG. 1.

FIG. 1 is a schematic diagram illustrating an indoor configuration of an automobile 10 in which a head-up display (HUD) 100, which is an embodiment of a projection display device of the present invention, is mounted. FIG. 2 is a schematic diagram illustrating an internal hardware configuration of a control unit 4 of the HUD 100 illustrated in FIG. 1.

A part of a front windshield 1 of the automobile 10 is a region that has been processed to reflect image light, which will be described below, and this region constitutes a projection surface 2.

The HUD 100 is mounted in the automobile 10 and enables a driver of the automobile 10 to visually recognize a virtual image or real image by using image light projected onto the projection surface 2, which is a region of a part of the front windshield 1 of the automobile 10.

The HUD 100 may be used by being mounted in a vehicle, such as a train, a heavy machine, a construction machine, an aircraft, a ship, or an agricultural machine, as well as an automobile.

In the example in FIG. 1, the HUD 100 is built in a dashboard 3 of the automobile 10. The dashboard 3 is a member that contains, in its inside, built-in components including gauges for presenting information necessary for driving, such as a speedometer, a tachometer, a fuel gauge, a water temperature gauge, an odometer, or the like of the automobile 10.

The HUD 100 includes the control unit 4, a projection lens 46, a diffusion member 6, a reflection mirror 7, and a concave mirror 8. The control unit 4 includes a light source and a light modulation element that spatially modulates, in accordance with image data, light emitted by the light source. The projection lens 46, the diffusion member 6, the reflection mirror 7, and the concave mirror 8 constitute a projection optical system that projects, onto the projection surface 2 of the front windshield 1, image light that has been spatially modulated by the light modulation element of the control unit 4. The projection lens 46 is built in the control unit 4.

The diffusion member 6 is a member that diffuses the image light that has been spatially modulated by the light modulation element of the control unit 4, thereby making a plane light source. As the diffusion member 6, a micromirror array having a fine structure on its surface, a diffusion mirror, a microlens-array (MLA) diffuser, a reflection holographic diffuser, or the like is used. The diffusion member 6 causes an intermediate image, which is generated in accordance with the image light projected thereto, to enter the reflection mirror 7.

The projection lens 46 is an optical system for forming, on the diffusion member 6, an image that is based on the image light that has been spatially modulated by a light modulation element 44. In the projection lens 46, the focal length is variable, and a change in the focal length enables a change in the size of an intermediate image formed on the diffusion member 6. The size of an intermediate image formed on the diffusion member 6 in a state where the focal length of the projection lens 46 is small is larger than the size of an intermediate image formed on the diffusion member 6 in a state where the focal length of the projection lens 46 is large. The projection lens 46 functions as a variable magnification lens.

The reflection mirror 7 reflects the image light diffused by the diffusion member 6 (corresponding to the foregoing intermediate image). The reflection mirror 7 may be constituted by a plurality of mirrors. Alternatively, the reflection mirror 7 may be omitted so that an intermediate image directly enters the concave mirror 8.

The concave mirror 8 enlarges and reflects the image light reflected by the reflection mirror 7 and projects the image light onto the projection surface 2. The projection surface 2 of the front windshield 1 has been processed to reflect the image light projected from the concave mirror 8 in the direction of the eyes of the driver. The concave mirror 8 may be constituted by a plurality of mirrors.

Alternatively, the HUD 100 may be disposed near the ceiling of the automobile 10, for example, and may be configured to project image light onto a combiner installed near the ceiling of the automobile 10. In this configuration, the combiner constitutes a projection surface.

The driver of the automobile 10 is able to visually recognize information, such as an icon or characters, for assisting driving, by looking at a virtual image that is based on the image light projected onto and reflected by the projection surface 2. In addition, the projection surface 2 has a function of allowing light from the outside (outside world) of the front windshield 1 to pass therethrough. Thus, the driver is able to visually recognize an image in which a virtual image that is based on the image light projected from the concave mirror 8 and an outside view are superimposed on one another.

The automobile 10 is settable to a first mode (also referred to as an automated driving mode or a remote driving mode) in which driving (operations of a direction indicator, a steering, an accelerator, a brake, and the like) is performed in accordance with an instruction internally generated by an automobile control unit that centrally controls the entire automobile 10 and that is not illustrated or an instruction externally and wirelessly received by the automobile control unit, and a second mode (manual driving mode) in which a person drives manually. The automobile 10 is provided with a mode switch button that is not illustrated. By operating the mode switch button, switching between the first mode and the second mode can be performed. The switching between the first mode and the second mode may be performed in a software manner without operating the mode switch button.

As illustrated in FIG. 2, the control unit 4 includes a light source unit 40, the light modulation element 44, a driving unit 45 that drives the light modulation element 44, the projection lens 46, a lens driving unit 47 that drives the projection lens 46, and a system control unit 60 that centrally controls the entire HUD 100.

The system control unit 60 includes a processor, a read only memory (ROM) storing a program or the like executed by the processor, and a random access memory (RAM) functioning as a work memory of the processor.

The light source unit 40 includes a light source control unit 40A, an R light source 41r serving as a red light source that emits red light, a G light source 41g serving as a green light source that emits green light, a B light source 41b serving as a blue light source that emits blue light, a dichroic prism 43, a collimator lens 42r provided between the R light source 41r and the dichroic prism 43, a collimator lens 42g provided between the G light source 41g and the dichroic prism 43, and a collimator lens 42b provided between the B light source 41b and the dichroic prism 43. The R light source 41r, the G light source 41g, and the B light source 41b constitute a light source of the HUD 100.

The dichroic prism 43 is an optical member for guiding rays of light emitted by the R light source 41r, the G light source 41g, and the B light source 41b to an identical light path. The dichroic prism 43 allows red light collimated by the collimator lens 42r to pass therethrough and emits the red light to the light modulation element 44. In addition, the dichroic prism 43 allows green light collimated by the collimator lens 42g to be reflected thereby and emits the green light to the light modulation element 44. Furthermore, the dichroic prism 43 allows blue light collimated by the collimator lens 42b to be reflected thereby and emits the blue light to the light modulation element 44. The optical member having such a function is not limited to the dichroic prism. For example, a cross dichroic mirror may be used.

A light emitting element, such as a laser or a light emitting diode (LED), is used as each of the R light source 41*r*, the G light source 41*g*, and the B light source 41*b*. The light source of the HUD 100 is not limited to the three light sources, that is, the R light source 41*r*, the G light source 41*g*, and the B light source 41*b*, and may be constituted by one light source, two light sources, or four or more light sources.

The light source control unit 40A controls each of the R light source 41*r*, the G light source 41*g*, and the B light source 41*b*, and performs control to cause light to be emitted by each of the R light source 41*r*, the G light source 41*g*, and the B light source 41*b*.

The light modulation element 44 spatially modulates, in accordance with image data received from the system control unit 60, the rays of light emitted by the R light source 41*r*, the G light source 41*g*, and the B light source 41*b* and emitted from the dichroic prism 43.

As the light modulation element 44, for example, liquid crystal on silicon (LCOS), a digital micromirror device (DMD), a liquid crystal display element, or the like may be used.

The driving unit 45 drives the light modulation element 44 in accordance with image data received from the system control unit 60 and causes image light that has been spatially modulated in accordance with the image data (red image light, blue image light, and green image light) to be emitted from the light modulation element 44 to the projection lens 46. The light modulation element 44 and the driving unit 45 constitute a light modulation unit of the HUD 100.

The lens driving unit 47 moves a part of the projection lens 46 in an optical axis direction to change the focal length of the projection lens 46, in response to an instruction from the system control unit 60.

The projection optical system constituted by the projection lens 46, the diffusion member 6, the reflection mirror 7, and the concave mirror 8 illustrated in FIG. 1 is optically designed so that an image that is based on image light projected onto the projection surface 2 can be visually recognized by the driver as a virtual image at a position in front of the front windshield 1. The projection optical system may be optically designed so that the image that is based on the image light can be visually recognized by the driver as a real image on the front windshield 1.

The system control unit 60 controls the light source control unit 40A and the driving unit 45 to cause image light that is based on image data to be emitted from the control unit 4.

Figure 3:
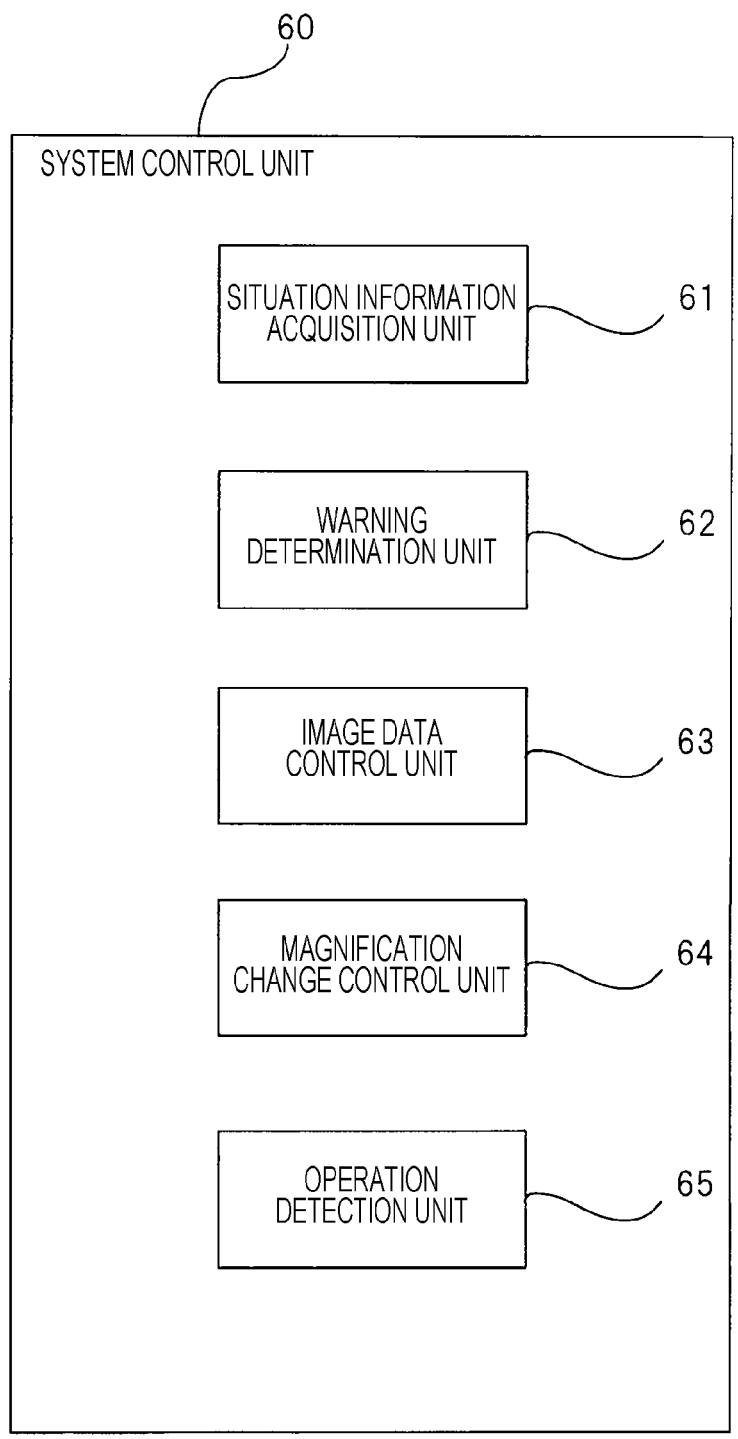
FIG. 3 is a functional block diagram of a system control unit 60 illustrated in FIG. 2.

FIG. 3 is a functional block diagram of the system control unit 60 illustrated in FIG. 2.

The system control unit 60 includes a situation information acquisition unit 61, a warning determination unit 62, an image data control unit 63, a magnification change control unit 64, and an operation detection unit 65.

The situation information acquisition unit 61, the warning determination unit 62, the image data control unit 63, the magnification change control unit 64, and the operation detection unit 65 are configured by executing a program stored in the ROM by the processor of the system control unit 60. The program includes a projection display program.

The situation information acquisition unit 61 acquires, from the automobile control unit that centrally controls the entire system of the automobile 10 and that is not illustrated, situation information, such as information indicating an anomaly of a gauge mounted in the automobile 10, information detected by a sensor (an ultrasonic radar, a millimeter-wave radar, a laser radar, a stereo camera, or the like) mounted in the automobile 10 and not illustrated, information indicating whether or not the sensor has a failure, or captured image data of a view in front of or behind the automobile 10, the image data being acquired by capturing an image by an imaging unit mounted on the body of the automobile 10 and not illustrated.

The warning determination unit 62 determines, in a state where the automobile 10 is in the first mode, in accordance with information acquired by the situation information acquisition unit 61, whether or not a state has occurred where a warning to a person in the automobile 10 (the driver seated on the driver's seat or a fellow passenger seated on a seat other than the driver's seat) is necessary.

Hereinafter, cases where the warning determination unit 62 determines that a warning is necessary will be given, but the cases are not limited thereto.

(1) The warning determination unit 62 analyzes information measured by the sensor. As a result of the analysis, when an obstacle, such as a person or a vehicle, is crossing in front of the automobile 10, the warning determination unit 62 determines that a state has occurred where a warning is necessary.

(2) The warning determination unit 62 analyzes information measured by the sensor mounted in the automobile 10. As a result of the analysis, when the distance between the automobile 10 and an obstacle is smaller than or equal to a threshold value, the warning determination unit 62 determines that a state has occurred where a warning is necessary.

(3) When the warning determination unit 62 detects a failure of the sensor necessary for driving in the first mode, the warning determination unit 62 determines that a state has occurred where a warning is necessary.

(4) When a gauge of the automobile 10 has an anomaly, the warning determination unit 62 determines that a state has occurred where a warning is necessary.

In the foregoing examples, the warning determination unit 62 analyzes information acquired by the situation information acquisition unit 61 and determines whether or not a state has occurred where a warning is necessary. However, the automobile control unit that centrally controls the automobile 10 may perform the analysis.

In this case, when the automobile control unit determines, as a result of the analysis, that a state has occurred where a warning is necessary, the automobile control unit inputs warning-required information indicating that a situation has occurred where a warning is necessary to the system control unit 60 of the HUD 100. Subsequently, the situation information acquisition unit 61 acquires the warning-required information received from the automobile control unit, and the warning determination unit 62 determines, in accordance with the warning-required information, that a state has occurred where a warning is necessary.

The image data control unit 63 controls image data to be input to the driving unit 45. In a state were the automobile 10 is in the first mode, the image data control unit 63 switches the image data to be input to the driving unit 45 between first image data and second image data.

The first image data is data for displaying first display information. The first display information is information, such as an icon or text, necessary for assisting driving, such as information for performing route guidance to a destination or speed information of the automobile 10.

The first image data is constituted by a pixel data group corresponding to the first display information and a pixel data group corresponding to a background portion which is different from the first display information. In a state where the first image data has been input to the driving unit 45, image light that has been spatially modulated in accordance with the pixel data group corresponding to the background portion does not reach the projection surface 2 whereas image light that has been spatially modulated in accordance with the pixel data group corresponding to the first display information reaches the projection surface 2.

That is, in a virtual image or real image that is visually recognized in a state where the first image data has been input to the driving unit 45, at least an outline portion of the first display information is displayed with color whereas the background portion is in a transparent state.

The second image data is data for displaying second display information. The second display information includes warning information that is predetermined in accordance with the content of a warning determined to be necessary by the warning determination unit 62.

The second image data is constituted by a pixel data group corresponding to the second display information and a pixel data group corresponding to a background portion which is different from the second display information. In a state where the second image data has been input to the driving unit 45, image light that has been spatially modulated in accordance with the pixel data group corresponding to the background portion reaches the projection surface 2 whereas image light that has been spatially modulated in accordance with the pixel data group corresponding to the second display information reaches or does not reach the projection surface 2.

That is, in a virtual image or real image that is visually recognized in a state where the second image data has been input to the driving unit 45, at least the background portion is displayed with color whereas the second display information is displayed with color or in a transparent state.

In a state where the automobile 10 is in the first mode, the image data control unit 63 uses the first image data as the image data to be input to the driving unit 45 when the warning determination unit 62 determines that a warning is not necessary, and uses the second image data as the image data to be input to the driving unit 45 when the warning determination unit 62 determines that a situation has occurred where a warning is necessary.

In a state where the first image data has been input to the driving unit 45, the magnification change control unit 64 controls, via the lens driving unit 47, the focal length of the projection lens 46 to a first value, and controls the size of an intermediate image to an initial value. In a state where the second image data has been input to the driving unit 45, the magnification change control unit 64 controls, via the lens driving unit 47, the focal length of the projection lens 46 to a second value smaller than the first value, and controls the size of an intermediate image to be larger than the initial value.

The operation detection unit 65 detects, in a state where the automobile 10 is in the first mode, that a predetermined operation has been performed on the automobile 10.

The predetermined operation is an operation that is determined in accordance with the content of a warning that has been determined to be necessary by the warning determination unit 62.

For example, a warning that is necessary when an obstacle, such as a person or a vehicle, is crossing in front of the automobile 10 (a warning calling for attention to the obstacle) is associated with a brake operation.

For example, a warning that is necessary when the distance between the automobile 10 and an obstacle is smaller than or equal to a threshold value (a warning calling for avoidance of collision with the obstacle) is associated with a steering wheel holding operation and a brake operation.

For example, a warning prompting switching from the first mode to the second mode is associated with an operation of the mode switch button that is not illustrated.

In the first mode, the operation detection unit 65 acquires information indicating the operation states of the brake, the steering wheel, and the mode switch button from the automobile control unit, and detects, in accordance with the information, that a predetermined operation has been performed. Upon detecting that the predetermined operation has been performed, the operation detection unit 65 outputs a detection signal of the operation to the image data control unit 63.

Figure 4:
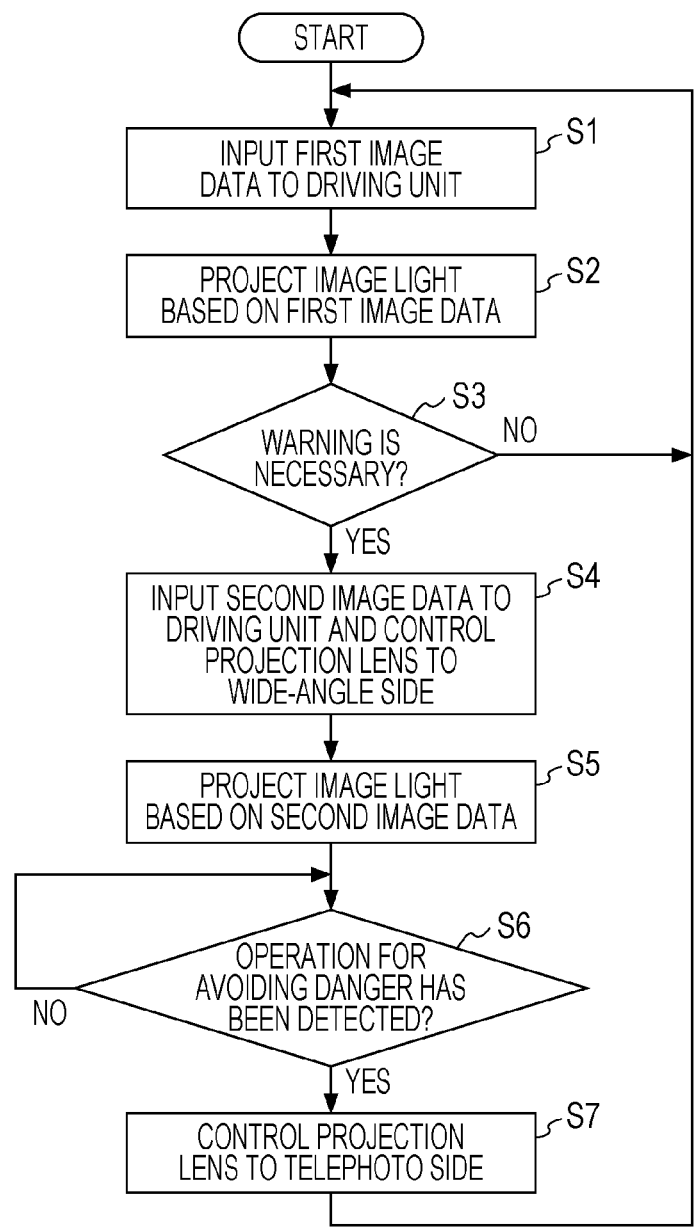
FIG. 4 is a flowchart for describing an operation of the HUD 100 illustrated in FIG. 1.

FIG. 4 is a flowchart for describing an operation of the HUD 100 illustrated in FIG. 1. The process illustrated in FIG. 4 is repeatedly performed while the power of the HUD 100 is in an ON state and the automobile 10 is in the first mode.

Figure 5:
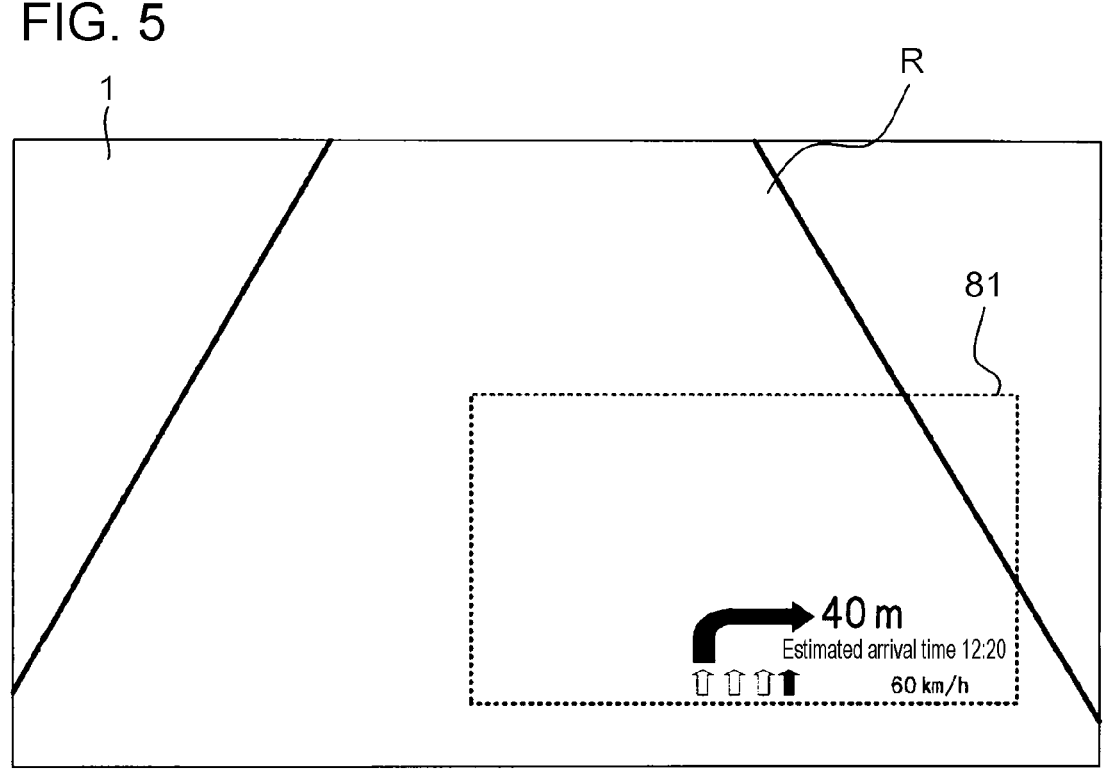
FIG. 5 is a diagram illustrating an example of an image that is based on first image data and that is observed through a front windshield 1.
Figure 6:
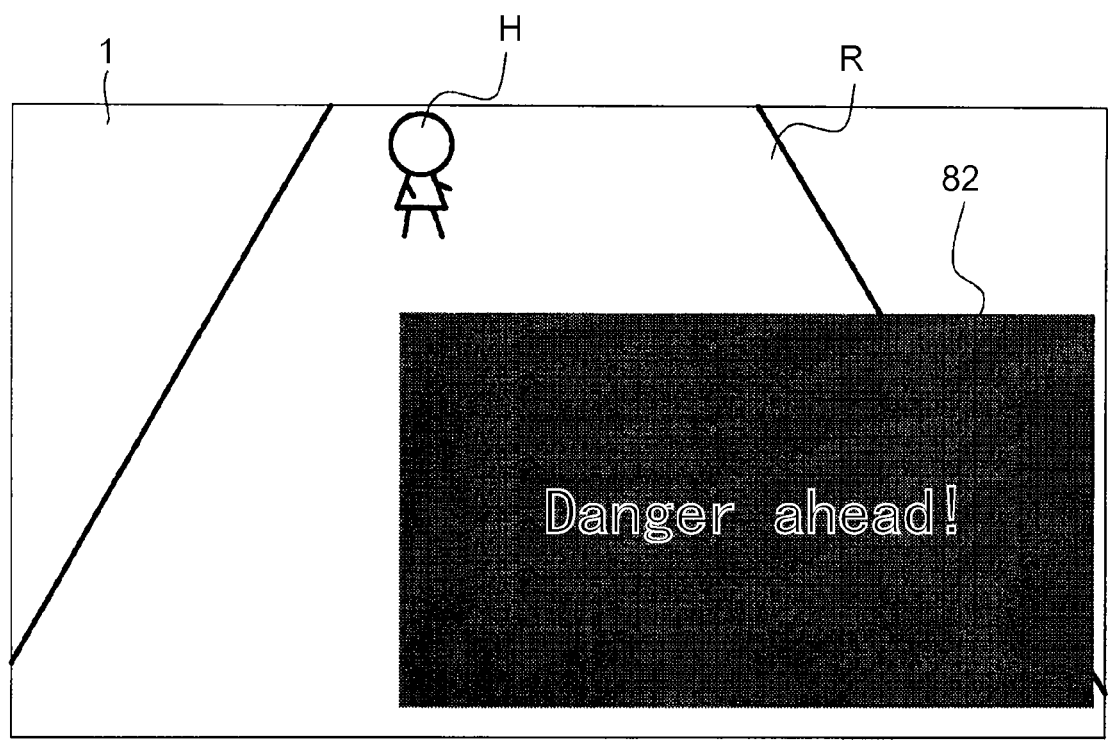
FIG. 6 is a diagram illustrating an example of an image that is based on second image data and that is observed through the front windshield 1.
Figure 7:
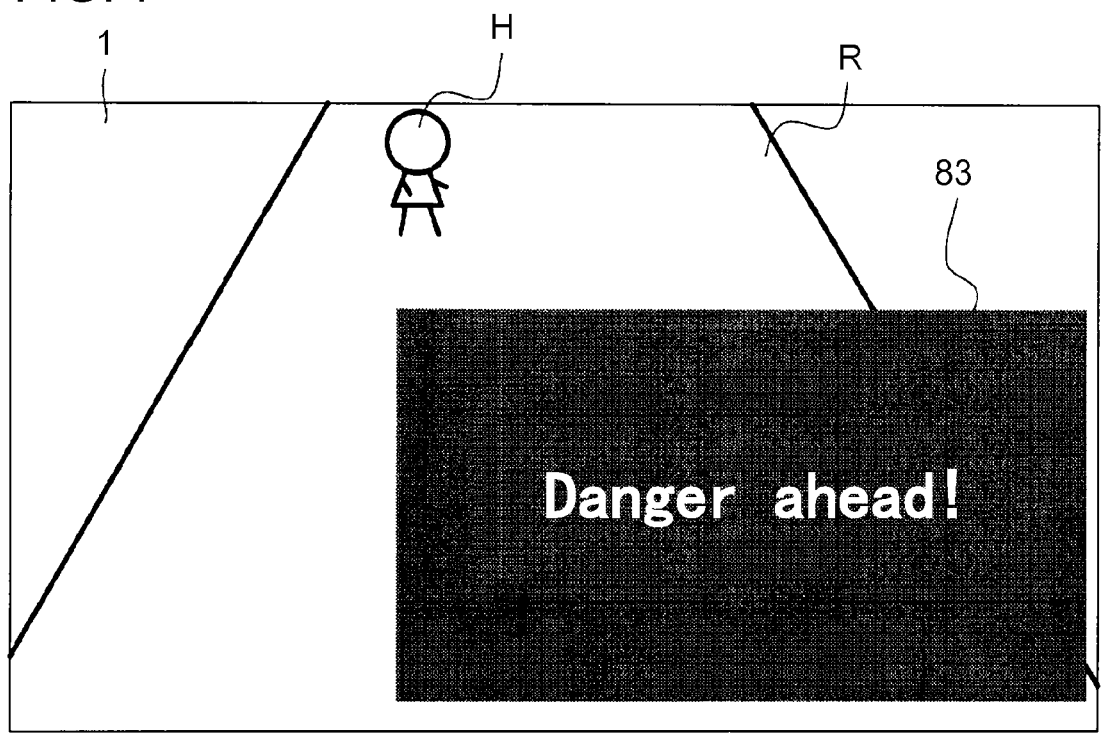
FIG. 7 is a diagram illustrating another example of an image that is based on the second image data and that is observed through the front windshield 1.

FIG. 5 is a diagram illustrating an example of an image that is based on the first image data and that is observed through the front windshield 1. FIG. 6 is a diagram illustrating an example of an image that is based on the second image data and that is observed through the front windshield 1. FIG. 7 is a diagram illustrating another example of an image that is based on the second image data and that is observed through the front windshield 1.

FIG. 5 illustrates a road R on which the automobile 10 is driving. FIGS. 6 and 7 illustrate the road R on which the automobile 10 is driving and a person H existing in front of the automobile 10.

Upon the automobile 10 being set to the first mode, the image data control unit 63 starts inputting the first image data to the driving unit 45 (step S1).

The driving unit 45 drives the light modulation element 44 in accordance with the first image data received from the image data control unit 63, thereby projecting image light that is based on the first image data onto the projection surface (step S2). Accordingly, a driving assisting image 81 is observed through the projection surface 2, as illustrated in FIG. 5.

The driving assisting image 81 illustrated in FIG. 5 includes, as the first display information, information for performing route guidance (arrows, the distance to an intersection, and an estimated arrival time) and speed information of the automobile 10. In the driving assisting image 81, a background portion which is different from the first display information is transparent. Accordingly, the field of vision of the driver is sufficiently ensured.

In this state, the warning determination unit 62 determines whether or not a state has occurred where a warning to the driver or a fellow passenger of the automobile 10 is necessary (step S3). When it is determined that a warning is not necessary (NO in step S3), the process returns to step S1, and the above-described process is repeated.

When it is determined that a state has occurred where a warning is necessary (YES in step S3), the image data control unit 63 switches the image data to be input to the driving unit 45 from the first image data to the second image data. The magnification change control unit 64 changes the focal length of the projection lens 46 from the first value to the second value to increase the size of an intermediate image (step S4).

The driving unit 45 drives the light modulation element 44 in accordance with the second image data received from the image data control unit 63, thereby projecting image light that is based on the second image data onto the projection surface 2 (step S5). Accordingly, as illustrated in FIG. 6, a warning image 82 is observed through the projection surface 2. Alternatively, as illustrated in FIG. 7, a warning image 83 is observed through the projection surface 2.

The warning image 82 illustrated in FIG. 6 includes, as the second display information, text calling for attention to the front, such as "Danger ahead!". In the warning image 82, the text portion is colored in a predetermined color, whereas the background portion which is different from the text portion is opaque in a color different from the color of the text portion.

Preferably, the background portion of the warning image 82 is colored in red, yellow, or the like so as to highlight the entire warning image 82. Preferably, the text portion of the warning image 82 is colored in a complementary color (for example, green) of the color of the background portion so as to increase the visibility of the text.

The warning image 83 illustrated in FIG. 7 includes, as the second display information, text calling for attention to the front, such as "Danger ahead!". In the warning image 83, the text portion is transparent, whereas the background portion which is different from the text portion is opaque in a predetermined color. Preferably, the background portion of the warning image 83 is colored in red, yellow, or the like so as to highlight the entire warning image 83. As can be understood by comparing FIG. 5 with FIGS. 6 and 7, the warning image is observed in a larger size than the driving assisting image.

After step S5, when the operation detection unit 65 detects that an operation for avoiding danger corresponding to the warning image illustrated in FIG. 6 or 7 has been performed (YES in step S6), the magnification change control unit 64 changes the focal length of the projection lens 46 to the first value (step S7). After that, the process returns to step S1, and the image data control unit 63 inputs the first image data to the driving unit 45. Accordingly, the image observed through the projection surface 2 is switched from the state illustrated in FIG. 6 or 7 to the state illustrated in FIG. 5.

As described above, according to the HUD 100, when it is determined that a state has occurred where a warning is necessary in a state where the automobile 10 is in the first mode, the display is switched from an image with a transparent background to an image with a colored background. With the change from a state where the background is transparent to a state where the background is colored, the driver or a fellow passenger is able to instantaneously sense the change in the image, and thus the degree of recognition of the warning can be increased. Thus, even during automated driving or remote driving, a warning can be effectively given to the driver or the fellow passenger, and safe driving can be assisted.

In addition, according to the HUD 100, when it is determined that a state has occurred where a warning is necessary in a state where the automobile 10 is in the first mode, an image larger than in a case where it is determined that a warning is not necessary is displayed. With the change from a small image size to a large image size, the driver or the fellow passenger is able to instantaneously sense the change in the image, and thus the degree of recognition of the warning can be increased. Thus, even during automated driving or remote driving, a warning can be effectively given to the driver or the fellow passenger, and safe driving can be assisted.

In addition, according to the HUD 100, when a specific operation is performed by the driver in a state where an image that is based on the second image data is displayed, the display is switched to an image that is based on the first image data. In the image that is based on the first image data, the background portion is transparent, and the display size is small. Thus, the driver is able to continue a driving operation for avoiding danger in a state where the field of front vision is sufficiently ensured and to avoid danger smoothly.

When the operation detection unit 65 detects the above-described predetermined operation in a state where the image data control unit 63 has input the second image data to the driving unit 45, the image data control unit 63 may stop inputting image data to the driving unit 45 and may restart the process in step S1 after a predetermined period of time elapses. With this configuration, the field of front vision of the driver can be further improved, and the driving operation for avoiding danger can be performed more smoothly.

When the image data control unit 63 stops inputting image data to the driving unit 45, as described above, it is preferable to restart the process in step S1 at the time point where the warning determination unit 62 determines that a warning is not necessary. With this configuration, the field of front vision of the driver can be sufficiently ensured while the warning is necessary. Thus, the driving operation for avoiding danger can be performed more smoothly.

When the operation detection unit 65 detects the above-described predetermined operation in a state where the image data control unit 63 has input the second image data to the driving unit 45, the image data control unit 63 may change the first image data to be input to the driving unit 45 to data for displaying third display information. The third display information is information indicating a specific instruction for avoiding danger.

Figure 8:
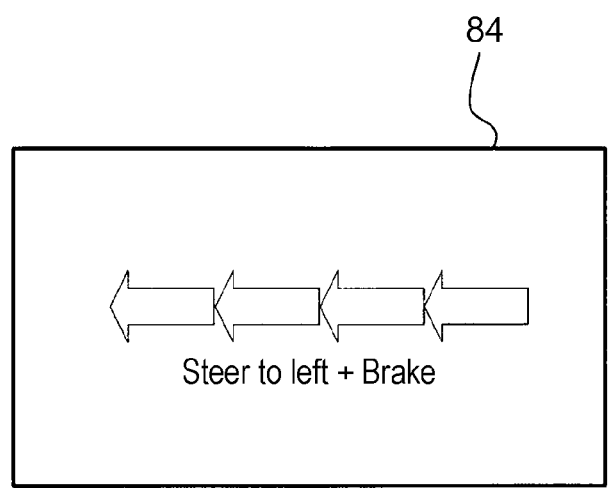
FIG. 8 is a diagram illustrating an example of an image that is based on the first image data and that is for displaying third display information.

FIG. 8 is a diagram illustrating an example of an image that is based on the first image data for displaying the third display information.

A driving assisting image 84 illustrated in FIG. 8 includes an icon and text for providing an instruction to perform an operation of steering to the left and applying the brake to avoid an obstacle ahead. The icon and text are displayed with color or only the outlines thereof are displayed with color, and the remaining background portion is transparent.

With the driving assisting image 84 illustrated in FIG. 8 being displayed, an instruction to take an action to avoid danger can be precisely provided to the driver, and danger avoidance can be smoothly performed.

It is preferable that the image data control unit 63 be configured to input only the first image data to the driving unit 45 when the automobile 10 is in the second mode (manual driving mode). With this configuration, an image with a transparent background is constantly displayed during manual driving. Thus, the field of front vision can be ensured and safe driving can be assisted.

When the automobile 10 is in the second mode, the first display information that is displayed in accordance with the first image data includes the same information as the above-described second display information in addition to information, such as an icon or text, necessary for assisting driving, such as information for performing route guidance to a destination or speed information of the automobile 10.

The HUD 100 need not necessarily include the magnification change control unit 64 and the lens driving unit 47. In this case, the focal length of the projection lens 46 is fixed. The operation performed in this case is that illustrated in FIG. 4 from which step S7 is deleted. In this case, a configuration can be adopted in which a micro electro mechanical systems (MEMS) element is used as the light modulation element 44 and spatial modulation is performed by using a laser projector scheme.

Next, a modification example of the HUD 100 illustrated in FIG. 1 will be described.

Figure 9:
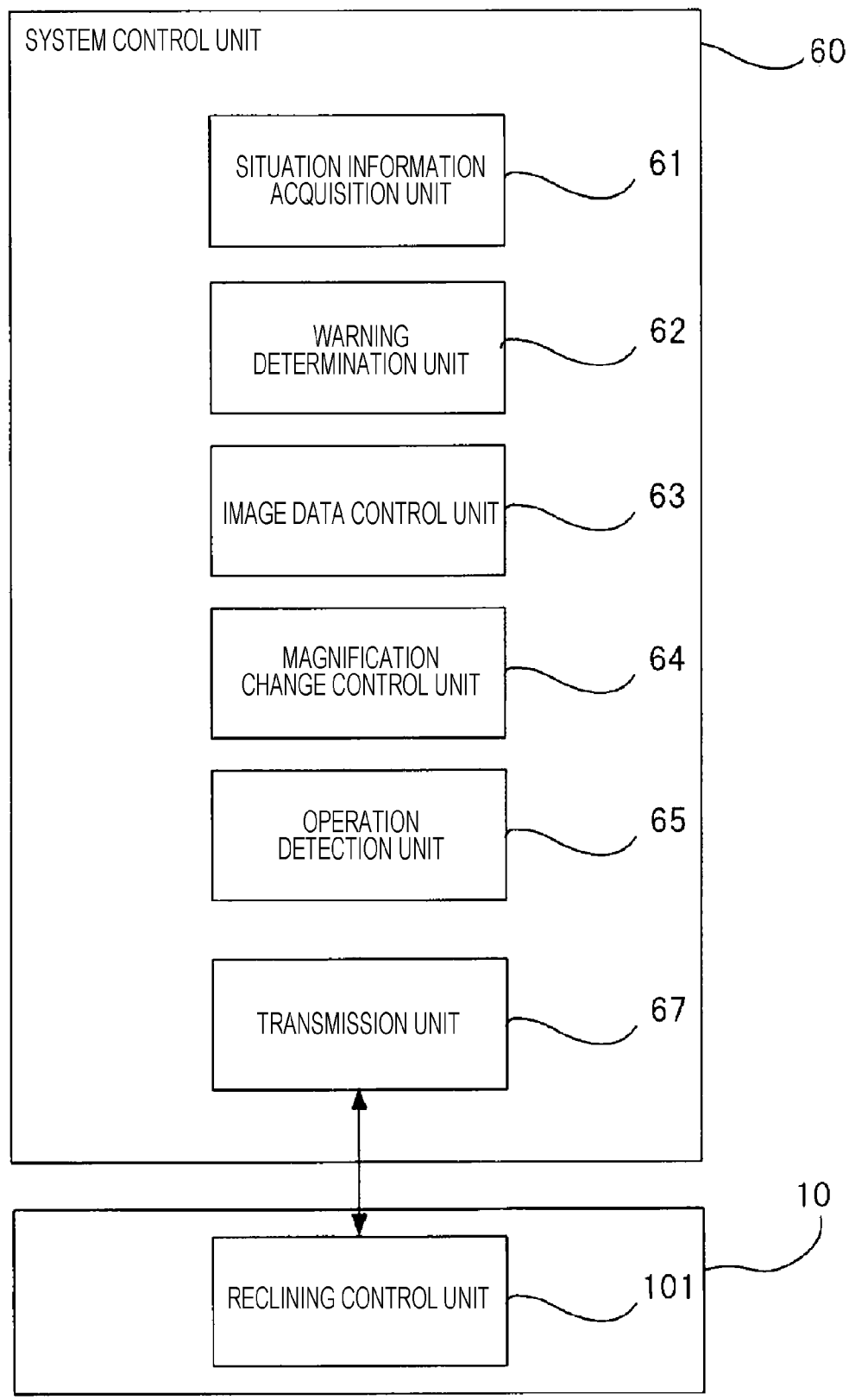
FIG. 9 is a diagram illustrating functional blocks of the system control unit 60 of the HUD 100 of a modification example.

FIG. 9 is a diagram illustrating functional blocks of the system control unit 60 of the HUD 100 of the modification example. In FIG. 9, the same components as those in FIG. 3 are denoted by the same numerals, and the description thereof is omitted.

The driver's seat of the automobile 10 in which the HUD 100 of this modification example is mounted is an electric reclining seat, and the reclining angle of the seat back can be electrically changed. In addition, the automobile 10 in which the HUD 100 of this modification example is mounted includes a reclining control unit 101 that controls the reclining angle of the seat back of the driver's seat. In addition, the projection optical system of the HUD 100 of this modification example is optically designed so that an image that is based on image light projected onto the projection surface 2 can be visually recognized by the driver as a virtual image at a position in front of the front windshield 1.

The system control unit 60 illustrated in FIG. 9 has the same configuration as that in FIG. 3 except that a transmission unit 67 is added.

In the HUD 100 of this modification example, an eyebox is set within which both eyes of a person seated on the driver's seat are assumed to be located, and the HUD 100 is designed so that the driver is able to visually recognize a virtual image that is based on image light when both the eyes of the driver are inside the eyebox.

The ROM of the system control unit 60 illustrated in FIG. 9 stores a range of angles of the seat back of the driver's seat of the automobile 10, the angles allowing a state to be kept where both the eyes of the driver are inside the eyebox.

When the transmission unit 67 detects that the automobile 10 has been set to the first mode, the transmission unit 67 generates a control signal for limiting the reclining angle of the seat back of the driver's seat within the above-described range of angles stored in the ROM, and transmits the control signal to the reclining control unit 101 of the automobile 10.

The reclining control unit 101 of the automobile 10 limits, in accordance with the control signal received from the system control unit 60, the reclining angle of the seat back of the driver's seat to be within the above-described designated range.

In this way, when the first mode is set, the system control unit 60 of the HUD 100 of the modification example generates a control signal for limiting the reclining angle of the seat back of the driver's seat so that the positions of both the eyes of the driver seated on the driver's seat are within a range where a virtual image that is based on image light projected onto the projection surface 2 is visually recognizable, and transmits the control signal to the reclining control unit 101 of the automobile 10.

Accordingly, in the first mode, the reclining angle of the seat back of the driver's seat can be changed only within the above-described range of angles. Thus, the driver does not lose sight of the virtual image displayed by the HUD 100. Thus, even during automated driving or remote driving, it is possible to cause the driver to reliably recognize a warning and to assist safe driving.

As described above, this specification discloses the followings.

(1) A projection display device mounted in a vehicle, the vehicle being equipped with a first mode in which driving is performed in accordance with an internally generated instruction or an externally and wirelessly received instruction, the projection display device including: a light modulation unit that spatially modulates, in accordance with image data that has been input, light emitted by a light source; a projection optical system that projects the light that has been spatially modulated onto a windshield of the vehicle or a combiner mounted in the vehicle; and an image data control unit that controls image data to be input to the light modulation unit, wherein the image data control unit performs, in the first mode, control to switch the image data to be input to the light modulation unit between first image data and second image data, the first image data is constituted by a pixel data group corresponding to first display information and a pixel data group corresponding to a background portion which is different from the first display information, and, in a state where the first image data has been input to the light modulation unit, the light that has been spatially modulated in accordance with the pixel data group corresponding to the background portion does not reach the windshield or the combiner whereas the light that has been spatially modulated in accordance with the pixel data group corresponding to the first display information reaches the windshield or the combiner, and the second image data is constituted by a pixel data group corresponding to second display information and a pixel data group corresponding to a background portion which is different from the second display information, and, in a state where the second image data has been input to the light modulation unit, at least the light that has been spatially modulated in accordance with the pixel data group corresponding to the background portion out of the light that has been spatially modulated in accordance with the pixel data group corresponding to the background portion and the light that has been spatially modulated in accordance with the pixel data group corresponding to the second display information reaches the windshield or the combiner.

(2) The projection display device described in (1), wherein the projection optical system includes a variable magnification lens capable of changing a size of an image that is based on the light that has been spatially modulated by the light modulation unit, and the projection display device further includes a magnification change control unit that controls the variable magnification lens to make the image in a state where the second image data has been input to the light modulation unit larger than the image in a state where the first image data has been input to the light modulation unit.

(3) The projection display device described in (1) or (2), wherein the vehicle is further equipped with a second mode in which a person drives manually, and in the second mode, the image data control unit performs control to use only the first image data as the image data to be input to the light modulation unit.

(4) The projection display device described in any one of (1) to (3), further including a warning determination unit that determines whether or not a state has occurred where a warning to a person in the vehicle is necessary, wherein in the first mode, the image data control unit inputs the first image data to the light modulation unit in a state where the warning determination unit has determined that the warning is not necessary, and inputs the second image data to the light modulation unit in a state where the warning determination unit has determined that the warning is necessary.

(5) The projection display device described in (4), further including an operation detection unit that detects, in the first mode, that a predetermined operation has been performed on the vehicle, wherein when the operation detection unit detects the predetermined operation in a state where the second image data has been input to the light modulation unit, the image data control unit switches the image data to be input to the light modulation unit to the first image data.

(6) The projection display device described in (4), further including an operation detection unit that detects, in the first mode, that a predetermined operation has been performed on the vehicle, wherein when the operation detection unit detects the predetermined operation in a state where the second image data has been input to the light modulation unit, the image data control unit stops inputting image data to the light modulation unit.

(7) The projection display device described in (6), wherein when the operation detection unit detects the predetermined operation in a state where the second image data has been input to the light modulation unit, the image data control unit stops inputting image data to the light modulation unit until the warning determination unit determines that the warning is not necessary.

(8) The projection display device described in any one of (1) to (7), wherein the vehicle has a reclining control unit that controls a reclining angle of a seat back of a driver's seat, the projection display device further includes a transmission unit that, in the first mode, generates a control signal for limiting the reclining angle of the seat back of the driver's seat of the vehicle within a range where a virtual image that is based on light projected by the projection optical system is visually recognizable by a driver seated on the driver's seat, and transmits the control signal to the reclining control unit, and the reclining control unit limits the reclining angle in accordance with the control signal.

(9) A projection display method using a light modulation unit that spatially modulates, in accordance with image data that has been input, light emitted by a light source, and a projection optical system that projects the light that has been spatially modulated onto a windshield of a vehicle or a combiner mounted in the vehicle, the vehicle being equipped with a first mode in which driving is performed in accordance with an internally generated instruction or an externally and wirelessly received instruction, the projection display method including: an image data control step of controlling image data to be input to the light modulation unit, wherein the image data control step performs, in the first mode, control to switch the image data to be input to the light modulation unit between first image data and second image data, the first image data is constituted by a pixel data group corresponding to first display information and a pixel data group corresponding to a background portion which is different from the first display information, and, in a state where the first image data has been input to the light modulation unit, the light that has been spatially modulated in accordance with the pixel data group corresponding to the background portion does not reach the windshield or the combiner whereas the light that has been spatially modulated in accordance with the pixel data group corresponding to the first display information reaches the windshield or the combiner, and the second image data is constituted by a pixel data group corresponding to second display information and a pixel data group corresponding to a background portion which is different from the second display information, and, in a state where the second image data has been input to the light modulation unit, at least the light that has been spatially modulated in accordance with the pixel data group corresponding to the background portion out of the light that has been spatially modulated in accordance with the pixel data group corresponding to the background portion and the light that has been spatially modulated in accordance with the pixel data group corresponding to the second display information reaches the windshield or the combiner.

(10) The projection display method described in (9), wherein the projection optical system includes a variable magnification lens capable of changing a size of an image that is based on the light that has been spatially modulated by the light modulation unit, and the projection display method further includes a magnification change control step of controlling the variable magnification lens to make the image in a state where the second image data has been input to the light modulation unit larger than the image in a state where the first image data has been input to the light modulation unit.

(11) The projection display method described in (9) or (10), wherein the vehicle is further equipped with a second mode in which a person drives manually, and in the second mode, the image data control step performs control to use only the first image data as the image data to be input to the light modulation unit.

(12) The projection display method described in any one of (9) to (11), further including a warning determination step of determining whether or not a state has occurred where a warning to a person in the vehicle is necessary, wherein in the first mode, the image data control step inputs the first image data to the light modulation unit in a state where the warning determination step has determined that the warning is not necessary, and inputs the second image data to the light modulation unit in a state where the warning determination step has determined that the warning is necessary.

(13) The projection display method described in (12), further including an operation detection step of detecting, in the first mode, that a predetermined operation has been performed on the vehicle, wherein when the operation detection step detects the predetermined operation in a state where the second image data has been input to the light modulation unit, the image data control step switches the image data to be input to the light modulation unit to the first image data.

(14) The projection display method described in (12), further including an operation detection step of detecting, in the first mode, that a predetermined operation has been performed on the vehicle, wherein when the operation detection step detects the predetermined operation in a state where the second image data has been input to the light modulation unit, the image data control step stops inputting image data to the light modulation unit.

(15) The projection display method described in (14), wherein when the operation detection step detects the predetermined operation in a state where the second image data has been input to the light modulation unit, the image data control step stops inputting image data to the light modulation unit until the warning determination step determines that the warning is not necessary.

(16) The projection display method described in any one of (9) to (15), wherein the vehicle has a reclining control unit that controls a reclining angle of a seat back of a driver's seat, the projection display method further includes a transmission step of, in the first mode, generating a control signal for limiting the reclining angle of the seat back of the driver's seat of the vehicle within a range where a virtual image that is based on light projected by the projection optical system is visually recognizable by a driver seated on the driver's seat, and transmitting the control signal to the reclining control unit, and the reclining control unit limits the reclining angle in accordance with the control signal.

(17) A projection display program using a light modulation unit that spatially modulates, in accordance with image data that has been input, light emitted by a light source, and a projection optical system that projects the light that has been spatially modulated onto a windshield of a vehicle or a combiner mounted in the vehicle, the vehicle being equipped with a first mode in which driving is performed in accordance with an internally generated instruction or an externally and wirelessly received instruction, the projection display program causing a computer to execute: an image data control step of controlling image data to be input to the light modulation unit, wherein the image data control step performs, in the first mode, control to switch the image data to be input to the light modulation unit between first image data and second image data, the first image data is constituted by a pixel data group corresponding to first display information and a pixel data group corresponding to a background portion which is different from the first display information, and, in a state where the first image data has been input to the light modulation unit, the light that has been spatially modulated in accordance with the pixel data group corresponding to the background portion does not reach the windshield or the combiner whereas the light that has been spatially modulated in accordance with the pixel data group corresponding to the first display information reaches the windshield or the combiner, and the second image data is constituted by a pixel data group corresponding to second display information and a pixel data group corresponding to a background portion which is different from the second display information, and, in a state where the second image data has been input to the light modulation unit, at least the light that has been spatially modulated in accordance with the pixel data group corresponding to the background portion out of the light that has been spatially modulated in accordance with the pixel data group corresponding to the background portion and the light that has been spatially modulated in accordance with the pixel data group corresponding to the second display information reaches the windshield or the combiner.

The present invention is applicable to a vehicle, such as an automobile, and enables safe driving assistance for the vehicle.

REFERENCE SIGNS LIST

100 HUD
1 front windshield
2 projection surface
3 dashboard
4 control unit
6 diffusion member
7 reflection mirror
8 concave mirror
10 automobile
40 light source unit
40A light source control unit
41*r* R light source
41*g* G light source
41*b* B light source
42*r*, 42*g*, 42*b* collimator lens
43 dichroic prism
44 light modulation element
45 driving unit
46 projection lens
47 lens driving unit
60 system control unit
61 situation information acquisition unit
62 warning determination unit
63 image date control unit
64 magnification change control unit
65 operation detection unit
67 transmission unit
81 driving assisting image
82, 83 warning image
84 driving assisting image
101 reclining control unit

What is claimed is:

1. A projection display device mounted in a vehicle, the vehicle being equipped with a first mode in which driving is performed in accordance with an internally generated instruction or an externally and wirelessly received instruction, the projection display device comprising:

a light modulator that spatially modulates, in accordance with image data that has been input, light emitted by a light source;

a projector that projects the light that has been spatially modulated onto a windshield of the vehicle or a combiner mounted in the vehicle; and a processor that controls image data to be input to the light modulator, wherein the processor performs, in the first mode, control to switch the image data to be input to the light modulator between first image data and second image data, the first image data is constituted by a pixel data group corresponding to first display information and a pixel data group corresponding to a background portion which is different from the first display information, and, in a state where the first image data has been input to the light modulator, the light that has been spatially modulated in accordance with the pixel data group corresponding to the background portion does not reach the windshield or the combiner whereas the light that has been spatially modulated in accordance with the pixel data group corresponding to the first display information reaches the windshield or the combiner, and the second image data is constituted by a pixel data group corresponding to second display information and a pixel data group corresponding to a background portion which is different from the second display information, and, in a state where the second image data has been input to the light modulator, at least the light that has been spatially modulated in accordance with the pixel data group corresponding to the background portion out of the light that has been spatially modulated in accordance with the pixel data group corresponding to the background portion and the light that has been spatially modulated in accordance with the pixel data group corresponding to the second display information reaches the windshield or the combiner.

2. The projection display device according to claim 1, wherein the projector includes a variable magnification lens capable of changing a size of an image that is based on the light that has been spatially modulated by the light modulator, and the projection display device further comprises a magnification change control unit that controls the variable magnification lens to make the image in a state where the second image data has been input to the light modulator larger than the image in a state where the first image data has been input to the light modulator.

3. The projection display device according to claim 1, wherein
the vehicle is further equipped with a second mode in which a person drives manually, and
in the second mode, the processor performs control to use only the first image data as the image data to be input to the light modulator.

4. The projection display device according to claim 2, wherein
the vehicle is further equipped with a second mode in which a person drives manually, and
in the second mode, the processor performs control to use only the first image data as the image data to be input to the light modulator.

5. The projection display device according to claim 1, wherein the processor further determines whether or not a state has occurred where a warning to a person in the vehicle is necessary, wherein
in the first mode, the processor inputs the first image data to the light modulator in a state where the processor has determined that the warning is not necessary, and inputs the second image data to the light modulator in a state where the processor has determined that the warning is necessary.

6. The projection display device according to claim 2, wherein the processor further determines whether or not a state has occurred where a warning to a person in the vehicle is necessary, wherein
in the first mode, the processor inputs the first image data to the light modulator in a state where the processor has determined that the warning is not necessary, and inputs the second image data to the light modulator in a state where the processor has determined that the warning is necessary.

7. The projection display device according to claim 3, wherein the processor further determines whether or not a state has occurred where a warning to a person in the vehicle is necessary, wherein
in the first mode, the processor inputs the first image data to the light modulator in a state where the processor has determined that the warning is not necessary, and inputs the second image data to the light modulator in a state where the processor has determined that the warning is necessary.

8. The projection display device according to claim 5, wherein the processor further detects, in the first mode, that a predetermined operation has been performed on the vehicle, wherein
when the processor detects the predetermined operation in a state where the second image data has been input to the light modulator, the processor switches the image data to be input to the light modulator to the first image data.

9. The projection display device according to claim 5, wherein the processor further detects, in the first mode, that a predetermined operation has been performed on the vehicle, wherein
when the processor detects the predetermined operation in a state where the second image data has been input to the light modulator, the processor stops inputting image data to the light modulator.

10. The projection display device according to claim 9, wherein
when the processor detects the predetermined operation in a state where the second image data has been input to the light modulator, the processor stops inputting image data to the light modulator until the processor determines that the warning is not necessary.

11. The projection display device according to claim 1, wherein
the vehicle has a controller that controls a reclining angle of a seat back of a driver's seat,
the projection display device further comprises a transmitter that, in the first mode, generates a control signal for limiting the reclining angle of the seat back of the driver's seat of the vehicle within a range where a virtual image that is based on light projected by the projector is visually recognizable by a driver seated on the driver's seat, and transmits the control signal to the controller, and
the controller limits the reclining angle in accordance with the control signal.

12. A projection display method using a light modulator that spatially modulates, in accordance with image data that has been input, light emitted by a light source, and a projector that projects the light that has been spatially modulated onto a windshield of a vehicle or a combiner mounted in the vehicle,
the vehicle being equipped with a first mode in which driving is performed in accordance with an internally generated instruction or an externally and wirelessly received instruction,
the projection display method comprising:
an image data control step of controlling image data to be input to the light modulator, wherein
the image data control step performs, in the first mode, control to switch the image data to be input to the light modulator between first image data and second image data,
the first image data is constituted by a pixel data group corresponding to first display information and a pixel data group corresponding to a background portion which is different from the first display information, and, in a state where the first image data has been input to the light modulator, the light that has been spatially modulated in accordance with the pixel data group corresponding to the background portion does not reach the windshield or the combiner whereas the light that has been spatially modulated in accordance with the pixel data group corresponding to the first display information reaches the windshield or the combiner, and
the second image data is constituted by a pixel data group corresponding to second display information and a pixel data group corresponding to a background portion which is different from the second display information, and, in a state where the second image data has been input to the light modulator, at least the light that has been spatially modulated in accordance with the pixel data group corresponding to the background portion out of the light that has been spatially modulated in accordance with the pixel data group corresponding to the background portion and the light that has been spatially modulated in accordance with the pixel data group corresponding to the second display information reaches the windshield or the combiner.

13. The projection display method according to claim 12, wherein
the projector includes a variable magnification lens capable of changing a size of an image that is based on the light that has been spatially modulated by the light modulator, and the projection display method further comprises a magnification change control step of controlling the variable magnification lens to make the image in a state where the second image data has been input to the light modulator larger than the image in a state where the first image data has been input to the light modulator.

14. The projection display method according to claim 12, wherein
the vehicle is further equipped with a second mode in which a person drives manually, and
in the second mode, the image data control step performs control to use only the first image data as the image data to be input to the light modulator.

15. The projection display method according to claim 12, further comprising a warning determination step of determining whether or not a state has occurred where a warning to a person in the vehicle is necessary, wherein
in the first mode, the image data control step inputs the first image data to the light modulator in a state where the warning determination step has determined that the warning is not necessary, and inputs the second image data to the light modulator in a state where the warning determination step has determined that the warning is necessary.

16. The projection display method according to claim 15, further comprising an operation detection step of detecting, in the first mode, that a predetermined operation has been performed on the vehicle, wherein
when the operation detection step detects the predetermined operation in a state where the second image data has been input to the light modulator, the image data control step switches the image data to be input to the light modulator to the first image data.

17. The projection display method according to claim 15, further comprising an operation detection step of detecting, in the first mode, that a predetermined operation has been performed on the vehicle, wherein
when the operation detection step detects the predetermined operation in a state where the second image data has been input to the light modulator, the image data control step stops inputting image data to the light modulator.

18. The projection display method according to claim 17, wherein
when the operation detection step detects the predetermined operation in a state where the second image data has been input to the light modulator, the image data control step stops inputting image data to the light modulator until the warning determination step determines that the warning is not necessary.

19. The projection display method according to claim 12, wherein
the vehicle has controller that controls a reclining angle of a seat back of a driver's seat,
the projection display method further comprises a transmission step of, in the first mode, generating a control signal for limiting the reclining angle of the seat back of the driver's seat of the vehicle within a range where a virtual image that is based on light projected by the projector is visually recognizable by a driver seated on the driver's seat, and transmitting the control signal to controller, and
the controller limits the reclining angle in accordance with the control signal.

20. A non-transitory computer readable recording medium storing a projection display program using a light modulator that spatially modulates, in accordance with image data that has been input, light emitted by a light source, and a projector that projects the light that has been spatially modulated onto a windshield of a vehicle or a combiner mounted in the vehicle,
the vehicle being equipped with a first mode in which driving is performed in accordance with an internally generated instruction or an externally and wirelessly received instruction,
the projection display program causing a computer to execute:
an image data control step of controlling image data to be input to the light modulator, wherein
the image data control step performs, in the first mode, control to switch the image data to be input to the light modulator between first image data and second image data,
the first image data is constituted by a pixel data group corresponding to first display information and a pixel data group corresponding to a background portion which is different from the first display information, and, in a state where the first image data has been input to the light modulator, the light that has been spatially modulated in accordance with the pixel data group corresponding to the background portion does not reach the windshield or the combiner whereas the light that has been spatially modulated in accordance with the pixel data group corresponding to the first display information reaches the windshield or the combiner, and
the second image data is constituted by a pixel data group corresponding to second display information and a pixel data group corresponding to a background portion which is different from the second display information, and, in a state where the second image data has been input to the light modulator, at least the light that has been spatially modulated in accordance with the pixel data group corresponding to the background portion out of the light that has been spatially modulated in accordance with the pixel data group corresponding to the background portion and the light that has been spatially modulated in accordance with the pixel data group corresponding to the second display information reaches the windshield or the combiner.

\* \* \* \* \*